(12) United States Patent
Noohi (10) Patent No.: US 11,142,913 B2
(45) Date of Patent: Oct. 12, 2021

(54) BALUSTRADE APPARATUS (71) Applicant: Kayvon Noohi, London (GB)

(72) Inventor: Kayvon Noohi, London (GB)

(*) Notice: Subject to any disclaimer, the term of this patent is extended or adjusted under 35 U.S.C. 154(b) by 0 days.

(21) Appl. No.: 16/317,462

(22) PCT Filed: Jul. 11, 2017

(86) PCT No.: PCT/GB2017/052032
§ 371 (c)(1),
(2) Date: Jan. 11, 2019

(87) PCT Pub. No.: WO2018/011564
PCT Pub. Date: Jan. 18, 2018

(65) Prior Publication Data
US 2019/0242137 A1 Aug. 8, 2019

(30) Foreign Application Priority Data
Jul. 12, 2016 (GB) .................................. 1612060

(51) Int. Cl.
*E04F 11/18* (2006.01)
*B60P 3/34* (2006.01)
*E04B 1/00* (2006.01)

(52) U.S. Cl.
CPC ............. *E04F 11/1865* (2013.01); *B60P 3/34* (2013.01); *E04B 1/003* (2013.01)

(58) Field of Classification Search
CPC ..... B60J 5/102; B60J 5/104; B60J 5/12; B60J 3/34; B60J 3/36; B60J 3/39; E04B 1/346; E04B 1/003; E04B 1/0038; E04F 2011/1868; E04F 2011/187;
(Continued)

(56) References Cited

U.S. PATENT DOCUMENTS 2,920,920 A * 1/1960 Couse .................. E04B 1/3442
296/26.02
4,090,585 A 5/1978 Laub
(Continued)

FOREIGN PATENT DOCUMENTS

CN 104563279 4/2015
CN 205348387 6/2016
(Continued)

*Primary Examiner* — Jessica L Laux
(74) *Attorney, Agent, or Firm* — Matthew G. McKinney, Esq.; Allen, Dyer et al.

(57) ABSTRACT

A balustrade apparatus for providing a balcony or increased floor space comprising a balustrade railing, a support fixing for retaining the balustrade railing in a retracted condition, a balcony platform which is pivotably engagable with the balustrade railing and an actuation means for actuating the balustrade railing between the retracted condition and an extended condition which is different to the retracted condition. In the extended condition, the balcony platform extends horizontally, with the balustrade railing being spaced apart from its position in the retracted condition to form a balcony rail for the balcony platform. The balustrade railing includes first and second railing portions which are movable relative to one another such that the balustrade railing is vertically extendible in at least the extended condition.

13 Claims, 8 Drawing Sheets (58) Field of Classification Search
CPC ....... E04F 2011/1876; E04F 2011/1885; E04F 2011/1889; E04F 11/1865; B60P 3/04
See application file for complete search history.

(56) References Cited

U.S. PATENT DOCUMENTS

| | | | | |
|---|---|---|---|---|
| 7,686,381 | B1 * | 3/2010 | Leonard | B60P 3/343 |
| | | | | 296/162 |
| 7,841,136 | B2 * | 11/2010 | Czyznikiewicz | E04B 1/3444 |
| | | | | 52/71 |
| 7,882,659 | B2 * | 2/2011 | Gyory | E04B 1/3444 |
| | | | | 52/79.5 |
| 8,347,560 | B2 * | 1/2013 | Gyory | E04B 1/3444 |
| | | | | 52/79.5 |
| 9,896,017 | B1 * | 2/2018 | Requejo | B60P 3/34 |
| 10,730,372 | B2 * | 8/2020 | Roth | B60J 5/107 |
| 2008/0296922 | A1 * | 12/2008 | Diamond | B60P 3/34 |
| | | | | 296/26.13 |
| 2018/0022262 | A1 * | 1/2018 | Roth | E04F 15/02 |
| | | | | 296/162 |

FOREIGN PATENT DOCUMENTS

| | | |
|---|---|---|
| EP | 1644591 | 1/2008 |
| EP | 2332820 | 6/2011 |
| EP | 3468837 | 4/2019 |
| GB | 2547737 | 11/2018 |
| KR | 1020120018559 | 3/2012 |
| WO | WO2004109024 | 12/2004 |
| WO | WO2018011564 | 1/2018 |

* cited by examiner

BALUSTRADE APPARATUS

RELATED APPLICATION

This application is based on prior filed co-pending International Application No. PCT/GB2017/052032 filed Jul. 11, 2017, which claims priority to Great Britain Application No. 1612060.2, filed Jul. 12, 2016, the entire subject matter of these applications is incorporated herein by reference in its entirety.

FIELD OF THE INVENTION

The present invention relates to a balustrade apparatus which allows for the opening of a balcony, preferably but not necessarily exclusively adjacent to a window of a building, either internally or externally. The invention may also be used in the context of ships, boats, trains, large road vehicles or any suitable construction which would benefit from the use of a security guard rail, balustrade or similar railing. A balustrade system for providing a balcony for a window and a method of providing an extendible and/or retractable balcony for a building are also provided.

BACKGROUND OF THE INVENTION

As population density in urban centres increases, there will be an increase in the number of dwellings which have no access to exterior spaces, and this a particular problem for apartments and flats. Some such buildings may include balconies which permit the resident a modicum of exterior space to experience.

Balconies are not universal, however, due to the increased difficulty of structural calculations relating to a balcony, since it must support a user's weight outside of the normal structure of the building, and also they may not be permitted in areas in which there is a conservation order, in particular, in locations in which the overall appearance of the area is coherent.

For similar reasons, balconies are rarely provided in buildings which are non-residential. Whilst this may not be an issue for commercial buildings, partially residential buildings may benefit from the installation of balconies, such as in hotels. This may serve to provide guests with a suitable outdoor experience during their stay.

Furthermore, since balconies are permanent structures which are typically only used during pleasant weather conditions, they tend to attract dirt, debris and other obstacles during the autumn and winter months which may prevent subsequent enjoyment of the balcony and/or increase maintenance costs.

SUMMARY OF THE INVENTION

The present invention seeks to provide a way of providing a balcony for a window or any internal or external platform which provides a safety barrier inside or outside a building without detracting from the aesthetic appearance of the building.

According to a first aspect of the invention, there is provided a balustrade apparatus for providing a balcony or increased floor space, the balustrade apparatus comprising: a balustrade railing; a support fixing for retaining the balustrade railing in a retracted condition; a balcony platform which is engagable with the balustrade railing; and an actuation means for actuating the balustrade railing between the retracted condition and an extended condition which is different to the extended condition; wherein, in the retracted condition, the balcony platform extends horizontally, with the balustrade railing being spaced apart from its position in the retracted condition to form a balcony rail for the balcony platform.

By providing an adjustable balustrade which can be configured between a traditional balustrade condition and a balcony condition, there is enabled a mechanism by which a room in a building can be enhanced with an outside space and/or any internal platform with a safety railing could similarly benefit. This can improve the well-being of a resident of the building, since outside space or additional floor space may not ordinarily be available to them. Furthermore, the aesthetic appearance of the building may also be improved.

Preferably, in the retracted condition, the balustrade railing and balcony platform may be co-planar with one another. The balustrade railing and balcony platform may be pivotable relative to one another.

There are various ways in which the balcony platform can be effectively hidden or covered when the apparatus is in the retracted condition. Providing a platform and railing which are pivotably engagable with one another can advantageously utilise gravitational pull to automatically align the balcony as the apparatus opens, with connectors providing the necessary support and counter-balancing. This provides a relatively simple mechanism by which the opening and closing of the apparatus can be effected.

The balustrade railing may be vertically extendible in at least the extended condition, in which case, the balustrade railing may comprise first and second railing portions which are movable relative to one another. The first and second railing portions may be pivotable relative to one another, or alternatively may be telescopically extendible and/or retractable relative to one another.

One of the problems of the folding balcony arrangement is that the level of the balustrade railing drops when moving to the extended condition. This can beneficially be overcome by providing a balustrade railing which can be extended in a vertical direction, if necessary, thereby providing the security and support required in order for safe use.

In one preferred embodiment, the balcony platform may be opaque or substantially opaque.

The provision of an opaque balcony platform means that, in a stowed condition, it can beneficially act as a privacy screen, which can be particularly important where the building includes full-length windows, or where the building is overlooked.

The actuation means may be manual, and/or may include one or more hydraulic actuators, electric motors, or alternatively may include one or more winches. Furthermore, the apparatus may include at least one barrier which is openable to provide a lateral balcony railing for the balcony platform. In one embodiment, the balcony platform may be receivable inside the building in the retracted condition.

According to a second aspect of the invention, there is provided a balustrade system for providing a balcony for a window, the balustrade system comprising: a balustrade apparatus in accordance with the first aspect of the invention; and an openable window associated with the balustrade apparatus; wherein one or more openable panels or the window are positionable to provide a barrier at or adjacent to a lateral edge of the balcony platform in the extended condition.

The window may optionally be a stable-door window having upper and lower openable panels. For example, the top section may open inwardly and the bottom section may open outwardly, thereby allowing the bottom section to act as side safety barriers to the extended balcony. The system may further comprise an awning positioned above the window which is openable to provide a cover to the balcony platform in the extended condition.

The use of the window to complete the rail for the balcony platform can advantageously reduce the cost of manufacture of the apparatus as a whole without compromising on the safety of the balcony, particularly for vulnerable users such as children, the elderly, and pets.

According to a third aspect of the invention, there is provided a method of providing an extendible and/or retractable balcony for a building, the method comprising the steps of: a] providing a balustrade apparatus, in accordance with the first aspect of the invention, in a retracted condition; and b] activating the actuation means of the apparatus to transition the apparatus into an extended condition, in which the balcony platform extends horizontally from a wall of the building, with the balustrade railing being spaced apart from the wall to form a balcony rail for the balcony platform.

The balcony platform may extend horizontally from an exterior wall of the building, or alternatively may extend horizontally from an interior wall of the building to form a mezzanine balcony.

The provision of a simple mechanism by which the internal space of a building can be converted so as to include an external space can greatly benefit the health and mental state of an individual resident in the building.

According to a fourth aspect of the invention, there is provided a railing apparatus for extending a floor space of a building above ground level, the railing apparatus comprising: a safety railing; a support fixing for retaining the safety railing in a retracted, substantially upright condition; a support platform which is engagable with the safety railing; and an actuation means for actuating the safety railing between the retracted condition and an extended condition which is different to the retracted condition; wherein, in the extended condition, the balcony platform extends horizontally to increase a floor space of a building above ground level, with the safety railing being spaced apart from its position in the retracted condition to form a rail for the support platform.

BRIEF DESCRIPTION OF THE DRAWINGS

The invention will now be more particularly described, by way of example only, with reference to the accompanying drawings, in which:

FIG. 2d is a front view of the balustrade apparatus of FIG. 2a;

DETAILED DESCRIPTION OF THE PREFERRED EMBODIMENTS

Figure 1A:
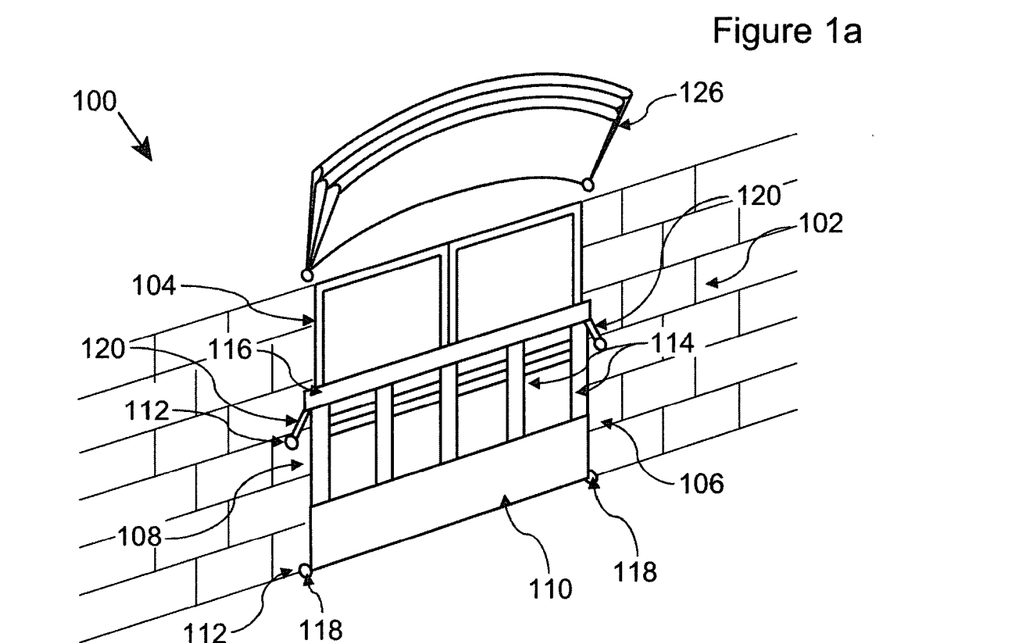
FIG. 1a is a perspective representation of a first embodiment of a balustrade apparatus in accordance with the first aspect of the invention, in a first, retracted condition.
Figure 1B:
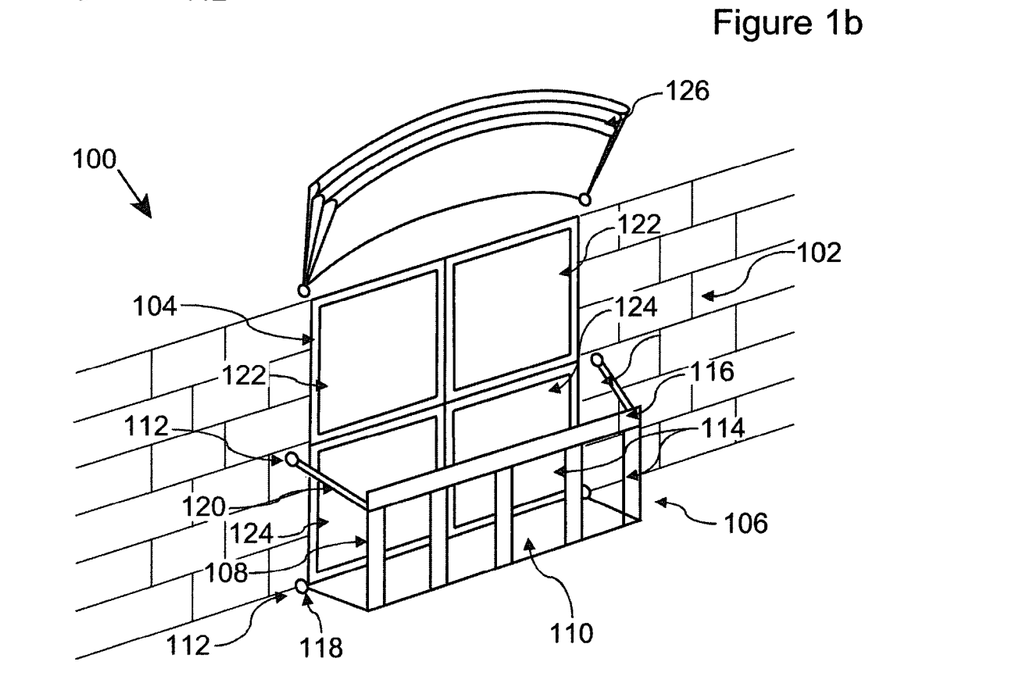
FIG. 1b is a perspective representation of the balustrade apparatus of FIG. 1a in a second, extended condition.
Figure 1C:
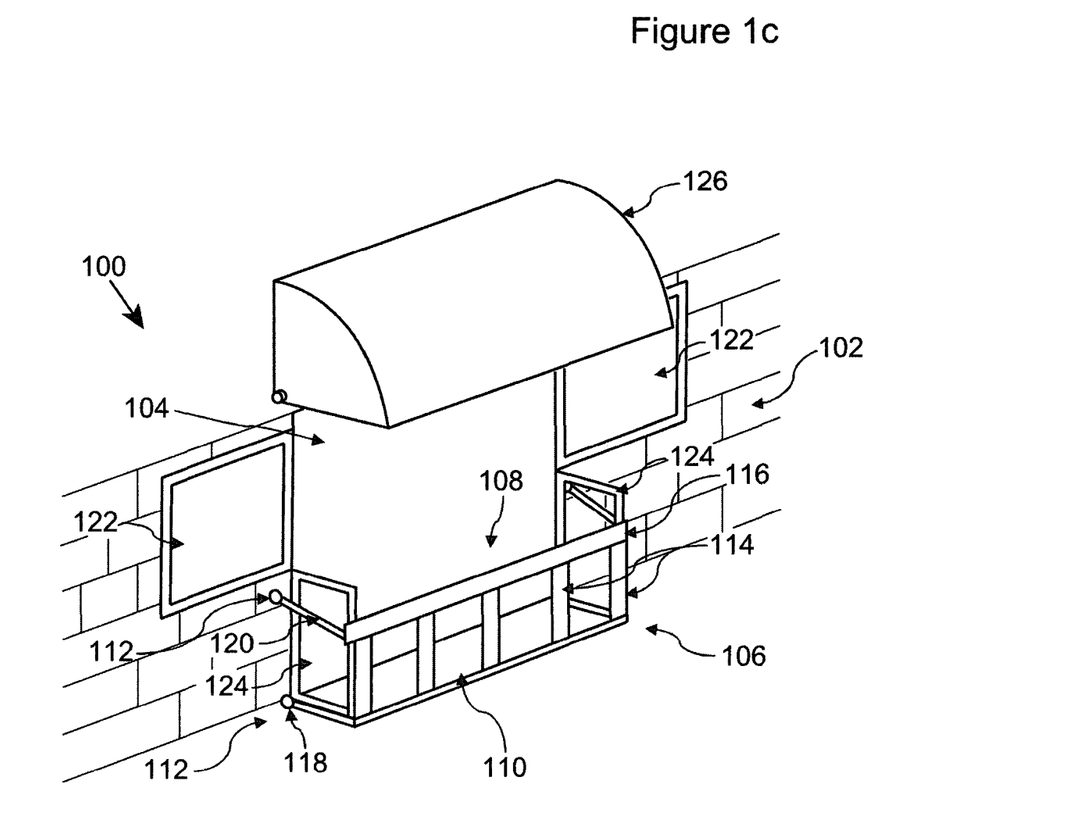
FIG. 1c is a perspective representation of the balustrade apparatus of FIG. 1a following opening of a window and awning associated with the apparatus.

Referring firstly to FIGS. 1a to 1c, there is shown a balustrade apparatus, indicated globally at 100, and which is here affixed to an exterior wall 102 of a building at or adjacent to a window 104 or similar opening in the wall 102. The balustrade apparatus 100 is configured so as to be convertible into a balcony or balconette upon which a user can stand. It will be appreciated that although the balustrade apparatus 100 is here shown as being external to the building, a similar arrangement could be provided internally to a building. For example, a mezzanine-type balcony could be provided so as to overlook a swimming pool, lower floor of the building, or even over a dancefloor. The present invention is therefore not restricted to exterior use. Similarly, there is no strict requirement for the present arrangement to be used at or adjacent to a window; a safety rail internal to a building could be converted between retracted and extended states in order to increase a usable floor space within the building.

The balustrade apparatus 100 has a balustrade 106 which includes a balustrade railing 108 or similar safety railing and a balcony platform 110. A support fixing 112 for retaining the balustrade railing 108 at or adjacent to the wall 102 and/or window 104 in a retracted or closed condition is also provided. The balcony platform 110 is provided so as to be engaged or engagable with the balustrade railing 108, preferably via a movable joint, and also an actuation means which can effect an actuation of the balustrade railing 108 between the retracted condition, which is at or adjacent to the wall 102, and an extended or opened condition in which the balcony platform 110 extends horizontally from the wall 102, with the balustrade railing 108 being spaced apart from the wall 102 to form a balcony rail.

In the depicted embodiment, the balustrade railing 108 preferably comprises a plurality of balusters or spindles 114 which extend from an edge of the balcony platform 110 so as to meet a handrail 116 at upper ends of the spindles 114. It will be appreciated, however, that balustrades having continuous balustrade railings are known, there being no spindles, and therefore the depicted form of balustrade railing 108 is for indicative purposes only.

The balcony platform 110 may preferably be formed as a contiguous platform having no apertures therethrough, and may optionally be opaque or near-opaque to act as a privacy screen for the window 104. It may be possible, however, to provide a mesh platform, for example; in the preferred scenario, there would be no possibility of a person standing on the balcony platform 110 to slip through or become lodged into the balcony platform 110.

The balustrade railing 108 and balcony platform 110 may preferably be formed from a strong, structurally stable metal, such as steel or aluminium. However, other materials may be possible, provided that sufficient structural support is provided to permit a person to walk onto the balcony platform 110 safely when the balustrade apparatus 100 is in an opened condition. For instance, wooden balustrades are popular and aesthetically-pleasing, and therefore a wooden or wood-effect balustrade railing 108 could be provided, at least.

The support fixing 112 in the depicted embodiment may preferably include one or more fasteners which can be secured into the structure of the wall 102. The type of fastener used may be dependent upon the construction of the building; in a brick-work building, for instance, securing holes may be drilled into the brick-work, with the fasteners then being secured into said holes. Preferably, at least four said wall fixings 112 may be provided, there being upper and lower fasteners on either side of the window 104, thereby providing the necessary structural integrity to maintain the balustrade apparatus 100 safely against the wall 102.

The lower support fixings 112 may be attached to pivotable joints 118, for example, which allow for the balcony platform 110 to be pivoted to and from the window 104. The upper support fixings 112 may be provided associated with connectors 120, such as levers or similar mechanical, electromechanical, and/or electrical connectors which help to guide the balustrade railing 108 between its retracted and extended conditions. In a preferred embodiment, it will be the connectors 120 which are engaged with the actuation means, such as hydraulic rams or pistons or a preferably electronic motor-driven actuator arrangement, in order to effect the transition between retracted and extended conditions. Other types of actuator may be appropriate depending on the structural and supportive requirements of the balcony platform 110 in order to be safely usable, for instance, winches or manual controllers.

The window 104 may be any standard construction of window; in the present embodiment, the window 104 is of a stable-door type, having four openable panels. There may be two upper panels 122 and two lower panels 124 which can be opened independently or in tandem with one another. There may also be an awning 126 as indicated, which is able to provide a roof or cover for the balustrade apparatus 100 when extended.

The balustrade apparatus 100 is shown in FIG. 1*a* in a first, retracted or closed condition. The balustrade railing 108 and balcony platform 110 are co-planar with one another, with the support fixings 112 holding both the balustrade railing 108 and balcony platform 110 at or adjacent to the window 104 and wall 102.

As the actuation means is activated, the connectors 120 which are engaged with the balustrade railing 108, preferably at or adjacent to the handrail 116, push the balustrade railing 108 away from the window 104 and/or wall 102. As this movement occurs, the balustrade railing 108 will be able to pivot or move about the edge of the balcony platform 110 to which the balustrade railing 108 is connected. This will have the effect of pivoting or moving the balcony platform 110 about its own pivotable joints 118, bringing the balcony platform 110 towards the horizontal. In turn, the balustrade railing 108 will become lowered vertically as it moves away from the wall 104.

An opened or extended condition of the balustrade apparatus 100 is shown in FIG. 1*b*. The balcony platform 110 has reached a horizontal condition following pivoting about its pivotable joints 118, and there may beneficially be provided one or more stops which can be arranged to prevent over-rotation of the balcony platform 110 and ensure that the balcony platform 110 is level in the extended condition. The stops may be physical stops, or may comprise one or more micro-switches which are positioned in, on, or adjacent to a frame of the window 104.

The balustrade railing 108 is, in FIG. 1*b*, in a position which is spaced apart from the window 104 and/or wall 102 and which project upwardly from the edge of the balcony platform 110 which is distal to the window 104. The connectors 120 have moved into a position which preferably maintains a verticality of the balustrade railing 108 so as to act as a balcony rail. It will be appreciated, however, that a balcony rail need not necessarily be planar; the spindles could be curved or arcuate, for example. It may therefore not be strictly necessary for the balustrade railing 108 to be perfectly vertical in the extended condition, though it will likely be upright or substantially upright in order to act as a balcony rail.

It may be possible to effect the transition between retracted and extended conditions of the balustrade apparatus 100 without opening the window 104, for instance by activation of a button inside the building which initialises the actuation means. This may preferably permit a user to engage a balcony condition prior to opening the window, which may be safer.

In FIG. 1*b*, there are no side railings to the balustrade apparatus 100 when in an opened position and acting as a balcony. This may be remedied by providing openable portions of the balustrade railing 108 which can, for instance, pivot into position to provide a complete railing enclosure around the balcony platform 110. However, and as shown in FIG. 1*c*, it may be possible to utilise the window 104 itself to provide a barrier to falling to the sides of the balcony platform 110.

Where a stable-door window is provided, the lower panels 124 may be outwardly openable and may be positioned so as to sit neatly along the lateral edges of the balcony platform 110 so as to present a lateral barrier. The lower panels 124 of the window 104, in conjunction with the balustrade railing 108, are therefore able to form a complete balcony railing about the balcony platform 110.

The balustrade apparatus 100 may be provided with one or more stops to retain the lower panels 124 in position once they are at or adjacent to lateral edges of the balcony platform 110. In the depicted embodiment, this may be achieved by the positioning of the connectors 120 relative to the eventual positioning of the lower panels 124 so as to inhibit further outward movement of the lower panels 124 once in situ. However, it will be apparent that dedicated stops could be provided, for example on the lateral edges of the balcony platform 110.

The upper panels 122 of the window 104 may, as indicated, be completely openable, and therefore positionable out of the user's way when the balustrade apparatus 100 is in the extended, balcony condition. It is also noted that the depicted arrangement could also work with french-door style windows, with the window panels providing full-length barriers at the lateral edges of the balcony platform 110 in use. The combination of the balustrade apparatus 100 and the window 104 can therefore be considered to be a whole balustrade system.

Using such an arrangement allows for the provision of a balcony which can be expanded or contracted in accordance with a user's desires. The balcony has a desirable aesthetic appearance as a balustrade when in a retracted condition, and in its extended condition provides a user with an outdoor space which can be enjoyed in an otherwise enclosed building. This may be particularly beneficial for apartments or flats without outside spaces, or could be used in hotels or other commercial environments, for instance.

There may be alternative mechanisms by which a balustrade could be converted into a balcony. One such embodiment is depicted in FIGS. 2a to 2f, and the external-wall balustrade apparatus is indicated therein globally at 200. Identical or similar features to those described in the context of the first embodiment of the invention will be referred to using identical or similar reference numerals, and further detailed description will be omitted for brevity.

Figure 2A:
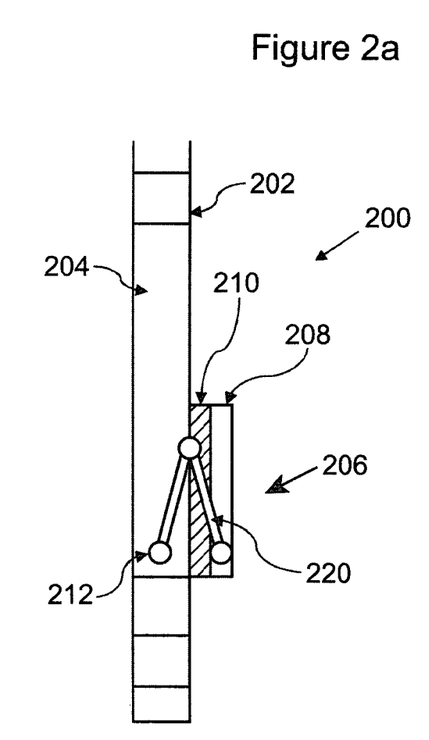
FIG. 2a is a side-on vertical cross-section through a second embodiment of a balustrade apparatus in accordance with the first aspect of the invention, in a first, retracted condition.
Figure 2B:
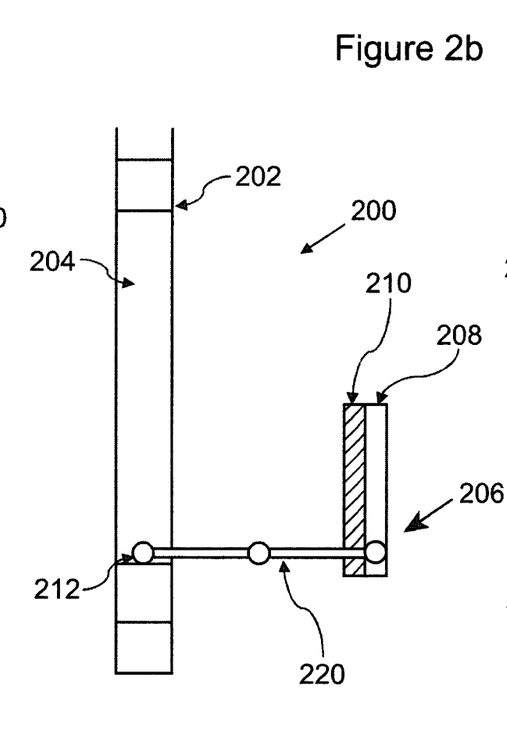
FIG. 2b is a side-on vertical cross-section of the balustrade apparatus of FIG. 2a, in a partially extended condition.
Figure 2C:
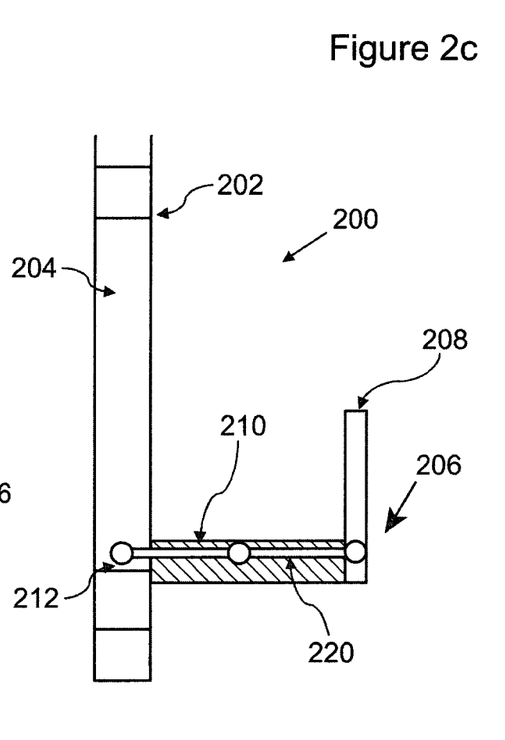
FIG. 2c is a side-on vertical cross-section of the balustrade apparatus of FIG. 2a, in a second, extended condition.
Figure 2D:
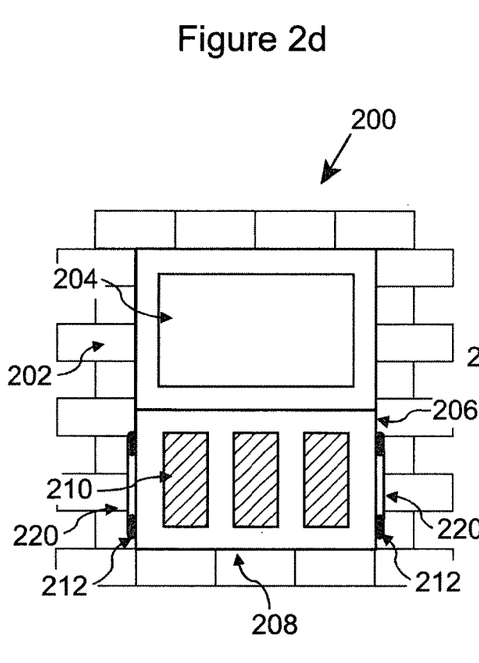

The balustrade apparatus 200 of FIGS. 2a and 2d is shown in the first, retracted condition. The balustrade 206 is here formed such that the balustrade railing 208 and balcony platform 210 are parallel to one another and contact with or are in close proximity to the other. From an exterior of the building, the balustrade railing 208 may be visible, with the balcony platform 210 acting as a privacy barrier for the window 204.

The actuation means and support fixing 212 may be formed together; here, a scissor linkage 220 is shown which can act to actuate the balustrade 206 toward or away from the window 204 and/or wall 202. A single scissor linkage 220 only is shown for clarity, but in practice, a plurality of such linkages may be required, driven or otherwise, in order to provide the necessary structural support for the balcony when extended.

Figure 2E:
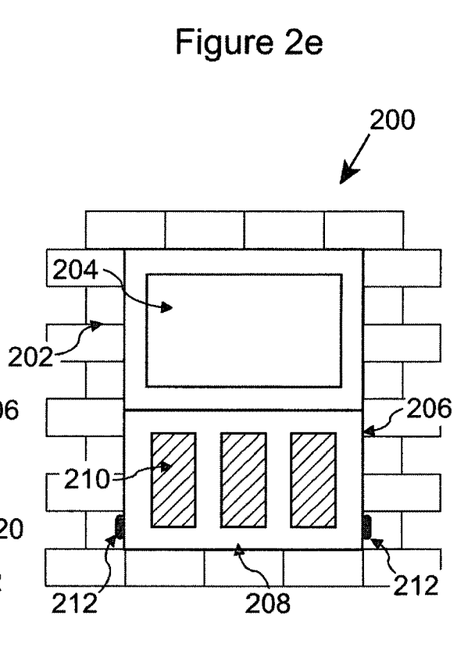
FIG. 2e is a front view of the balustrade apparatus of FIG. 2b.

The actuation of the balustrade 206 away from the window 204 can be seen in FIGS. 2b and 2e. The balustrade railing 208 and balcony platform 210 are pushed away from the window 204 by the actuation means until the balustrade railing 208 is at or near its final distance away from the wall 202.

Figure 2F:
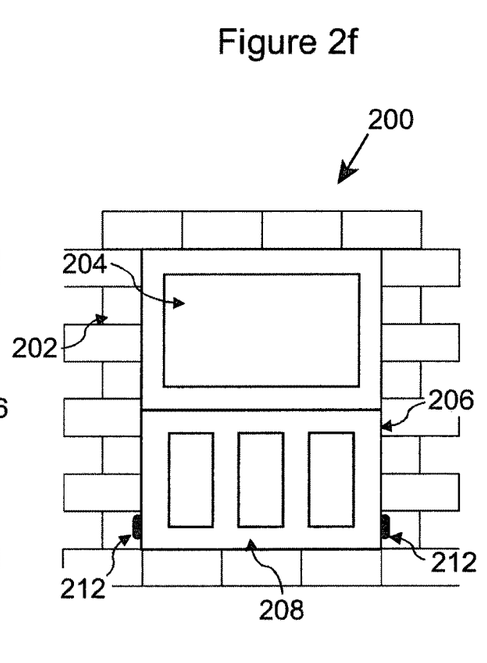
FIG. 2f is a front view of the balustrade apparatus of FIG. 2c.

Once the balustrade railing 208 is in position, as can be seen in FIGS. 2c and 2f, the balcony platform 210 can be pivoted or otherwise repositioned relative to the balustrade railing 208 such that it is moved to a horizontal position, extending towards the window 204 preferably from a lower edge of the balustrade railing 208. The balcony platform 210 is thus in position for a user to stand thereon.

It will be appreciated that side railings for the balcony platform 210 could be inserted, as described in respect of the first embodiment above, and as such, further detailed description will not be included here.

Figure 3A:
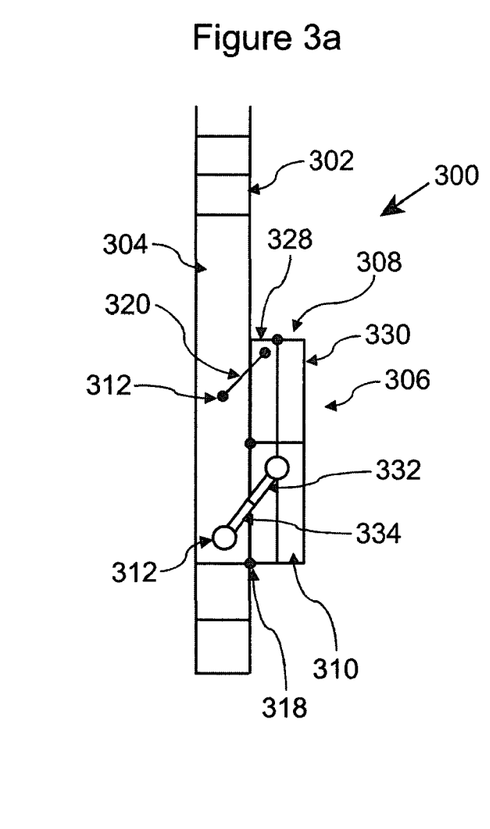
FIG. 3a is a side-on vertical cross-section of a third embodiment of a balustrade apparatus in accordance with the first aspect of the invention, in a first, retracted condition.
Figure 3B:
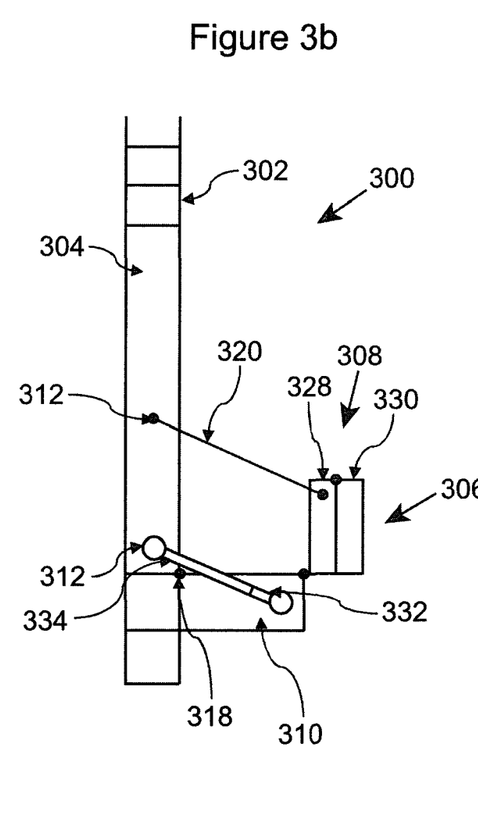
FIG. 3b is a side-on vertical cross-section of the balustrade apparatus of FIG. 3a, in a second, extended condition.
Figure 3C:
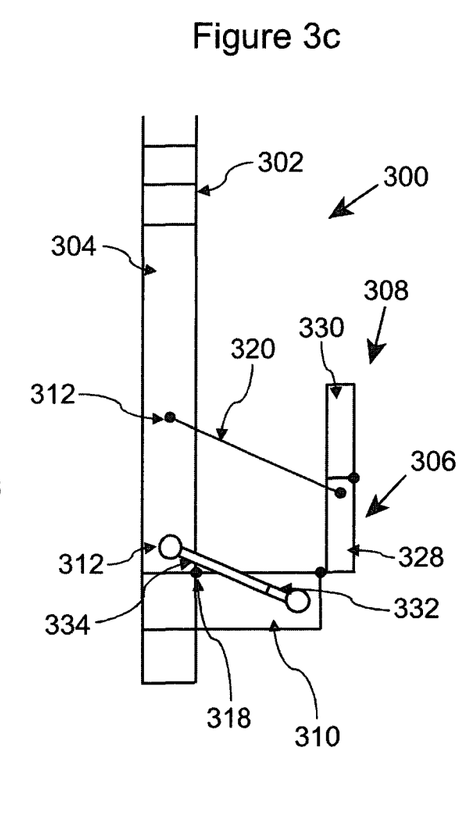
FIG. 3c is a side-on vertical cross-section of the balustrade apparatus of FIG. 3b, following extension of a balustrade railing in a vertical direction.

A third embodiment of a balustrade apparatus 300 is illustrated in FIGS. 3a to 3c. Again, identical or similar features to those described in the context of the first and second embodiments of the invention will be referred to using identical or similar reference numerals, and further detailed description will be omitted for brevity.

The balustrade apparatus 300 is shown in the retracted condition in FIG. 3a; the construction is similar to that shown in the first embodiment in that the balustrade railing 308 and balcony platform 310 are co-planar in the retracted condition. However, the balustrade railing 308 is here formed in first and second railing portions 328, 330 which are foldable or pivotable relative to one another.

In the first embodiment of the apparatus 100, the pivoting of the balustrade railing 108 resulted in a vertical lowering of the balustrade railing 108 with respect to the window 104. This embodiment of balustrade apparatus 300 attends to this issue.

As shown, the support fixings 312 of the apparatus 300 are here shown as being pivotable or rotatable. There is a pivotable joint 318 at the point at which the balcony platform 310 contacts the wall 302 or window 304. There is also a connector 320 between the balustrade railing 308 and the wall 304, which is here formed as a tensioned cable or wire to guide the balustrade railing 308 into position, and there is a linkage 332 provided associated with the actuation means, here provided as a hydraulic actuator 334, which provides the necessary force to transition the balustrade apparatus 300 between its retracted and extended conditions. An extended condition can be seen in FIG. 3b.

In order to raise a height of the balustrade railing 308, the second railing portion 330 can be repositioned, preferably by pivoting, relative to the first railing portion 328 such that the second railing portion 330 sits on top of the first railing portion 328, resulting in a complete and planar balustrade railing 308.

There are, of course, other mechanisms by which the height of a balustrade railing could be altered. For example, the balustrade railing could include telescopically extendible balusters or spindles, which could be adjusted for user preference. Furthermore, first and second railing portions could be provided which are slidably engagable with one another, or the second railing portion could be releasably engagable with the first railing portion to be attached only when required.

Figure 4A:
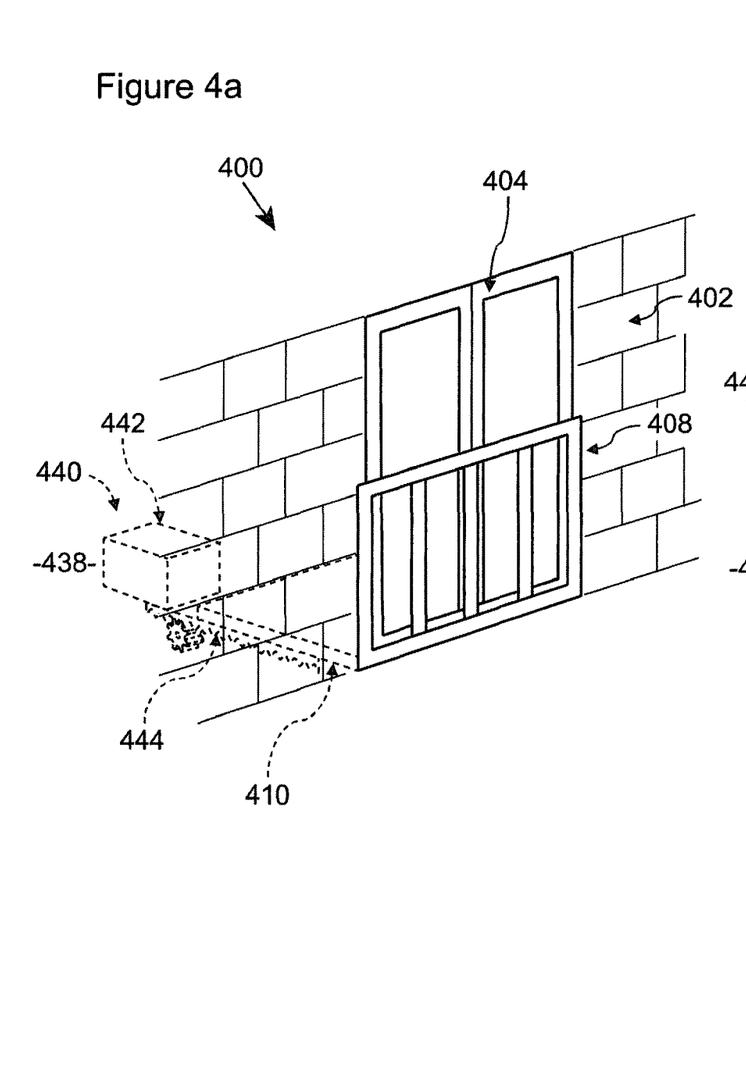
FIG. 4a is a perspective representation of a fourth embodiment of a balustrade apparatus in accordance with the first aspect of the invention, in a first, retracted condition.
Figure 4B:
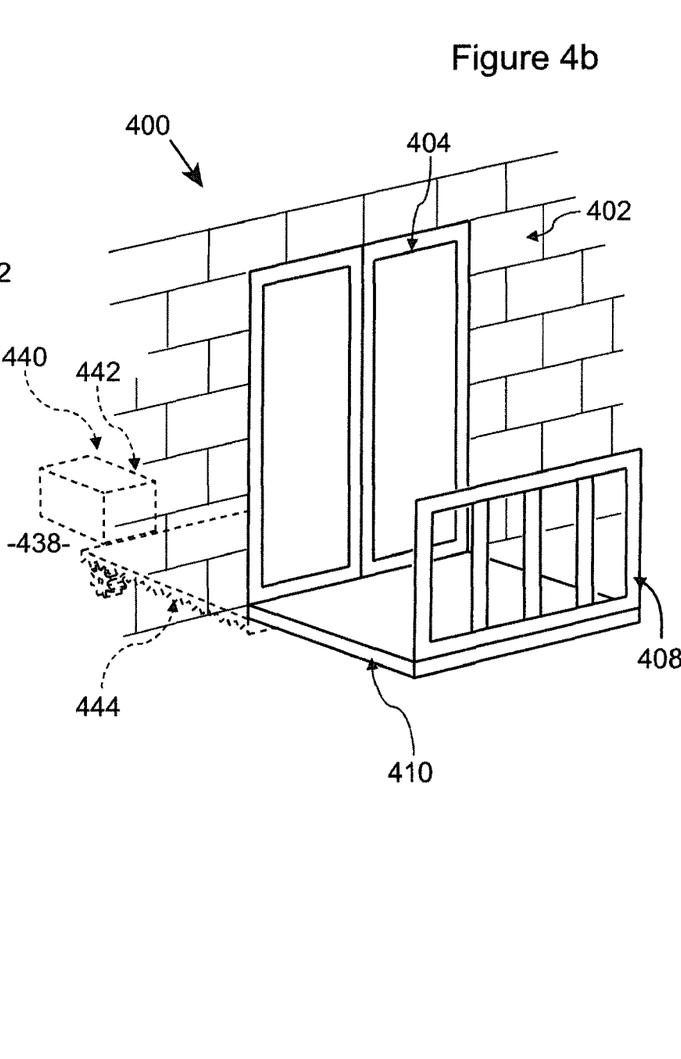
FIG. 4b is a perspective representation of the balustrade apparatus of FIG. 4a, in a second, extended condition.

A fourth embodiment of a balustrade apparatus 400 is illustrated in FIGS. 4a and 4b, and this embodiment illustrates a hidden balcony platform 410. Again, identical or similar features to those described in the context of the previously-described embodiments of the invention will be referred to using identical or similar reference numerals, and further detailed description will be omitted for brevity.

The balustrade railing 408 and balcony platform 410 may here be connected immovably to one another, unlike those described above. The balcony platform 410 is here recessed into the floor 436 of the building into which it is to be installed, and an actuator 440 provided, for example, the motor 442 and ratchet 444 illustrated, which is able to move the balcony platform 410 in a horizontal plane, taking the balustrade railing 408 with it.

Such an arrangement allows for a balustrade railing 408 to be provided which does not need to hide the balcony platform 408 on the wall 402 of the building. As previously mentioned, the window 402, here shown as french-doors, could be opened in order to provide lateral barriers for the balcony platform 410. However, this arrangement could be provided such that the balustrade railing 408 is double thickness, with lateral barriers being pivotably openable in a direction towards the window 404 in order to provide a complete balcony railing. Such lateral barriers may be provided on castors, rollers or wheels, allowing them to be readily positioned in place, or could alternatively just be clipped into position.

Figure 5A:
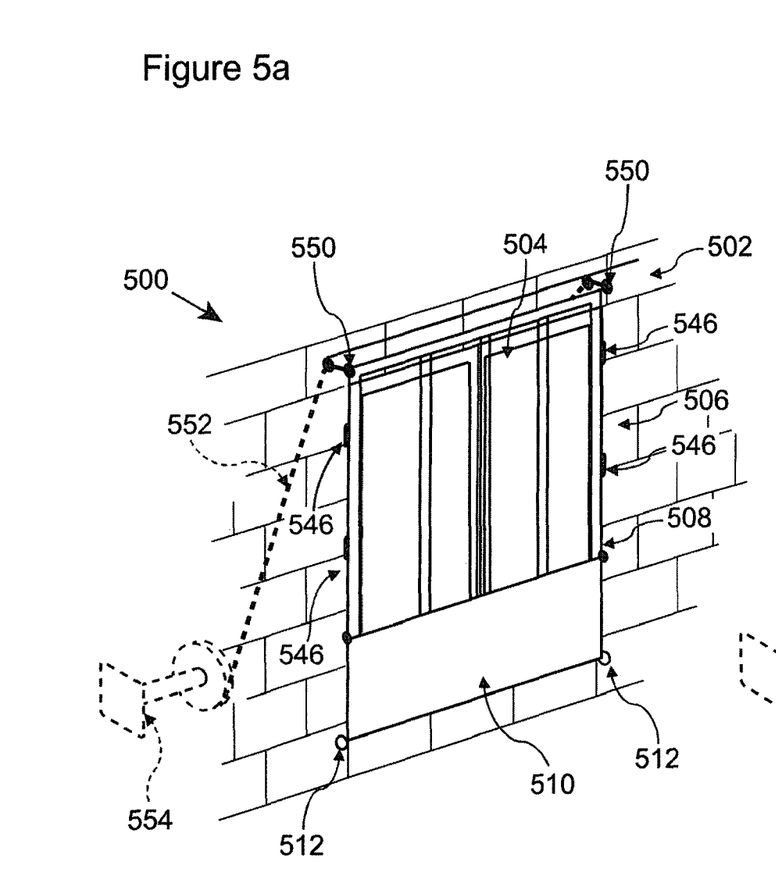
FIG. 5a is a perspective representation of a fifth embodiment of a balustrade apparatus in accordance with the first aspect of the invention, in a first retracted condition.
Figure 5B:
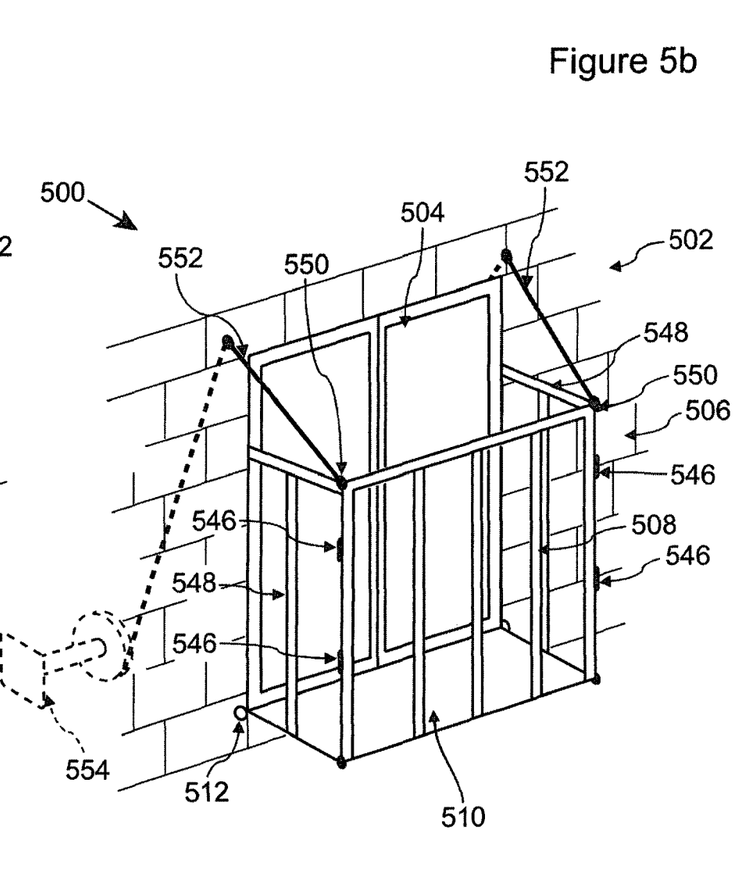
FIG. 5b is a perspective representation of the balustrade apparatus of FIG. 5a, in a second, extended condition.

A fifth embodiment of a balustrade apparatus 500 is illustrated in FIGS. 5a and 5b, and demonstrates a full-height balustrade railing 508. Again, identical or similar features to those described in the context of the previously-described embodiments of the invention will be referred to using identical or similar reference numerals, and further detailed description will be omitted for brevity.

The balustrade railing 508 is here formed so as to cover a majority or all of the length of the window 504 in the first, retracted condition, shown in FIG. 5a. The balustrade railing 508 includes a plurality of hinges 546 about which side balustrade railings 548 can pivot out to form a complete safety railing for the balcony platform 510.

In this embodiment, the balustrade railing 508 is pivotably engagable with the balcony platform 510, with the support fixings 512 being connected to the wall 502. However, at an upper end of the balustrade 506 are provided winch connections 550 which are connected to a cable 552 which can be extended and retracted to reposition the balustrade 506 between its first and second conditions. Here, a motor-driven winch arrangement 554 is shown inside the building; however, it will be appreciated that other arrangements are possible, such as the provision as an external driven arrangement.

As can be seen from the various embodiments of the invention described above, there are several possible ways in which a balustrade could be converted into a balcony or extended floor space. Although the arrangements described utilise an actuation means, typically being motor or hydraulic driven, it will be apparent that many different types of actuation means could be provided, ranging from manual opening, the use of cables, pulleys, winches or ropes to lower the balcony platform into position, or a series of jacks could be provided to bring the relevant components into their required configurations.

Figure 6A:
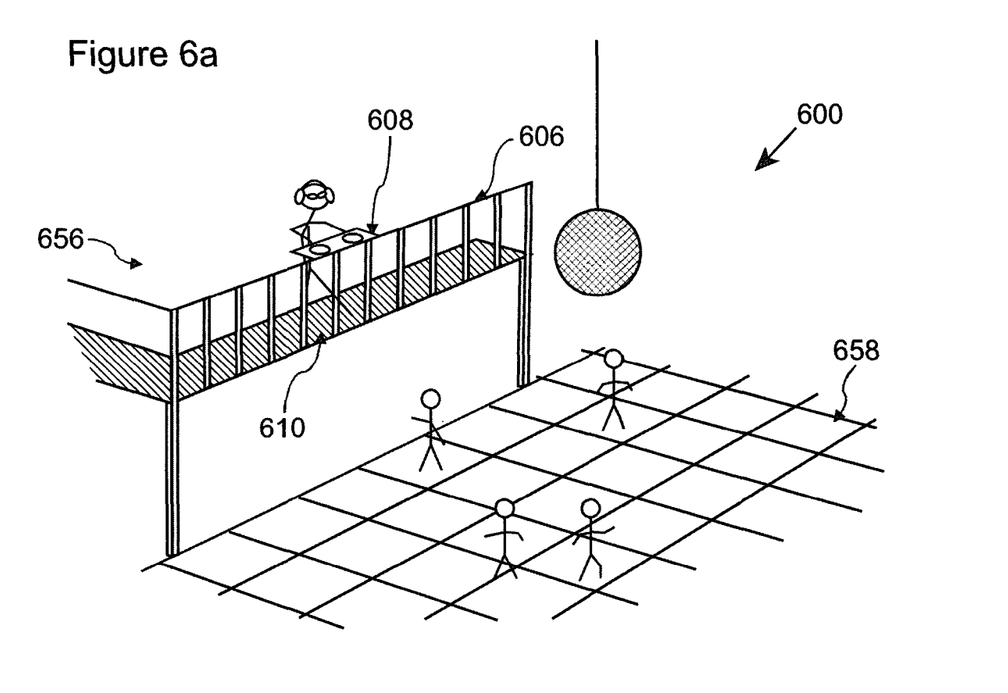
FIG. 6a is a perspective representation of a sixth embodiment of a safety railing apparatus in accordance with the fourth aspect of the invention, in a first retracted condition.
Figure 6B:
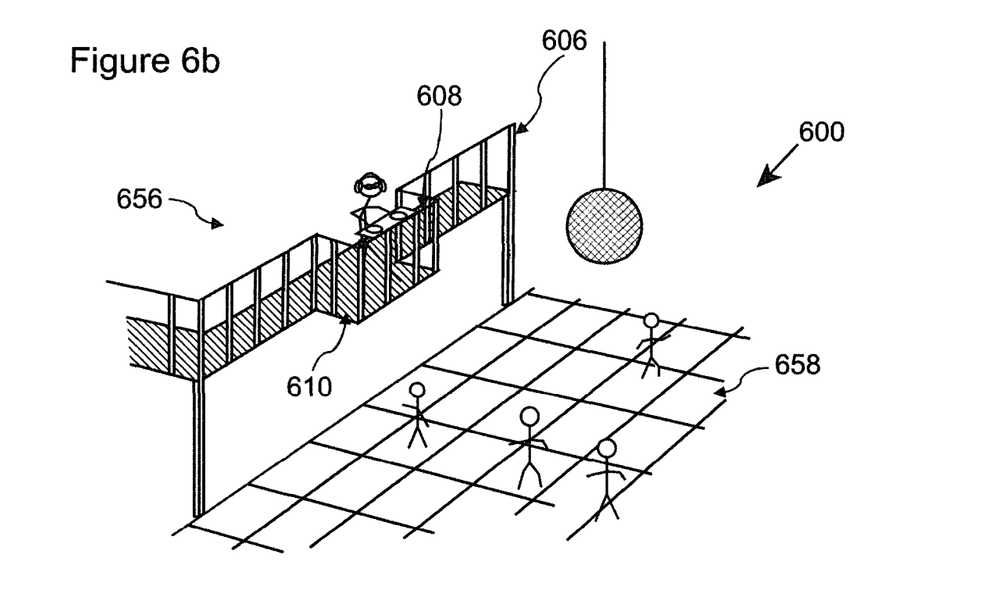
FIG. 6b is a perspective representation of the safety railing apparatus of FIG. 6a, in a second, extended condition.

A sixth embodiment of the invention is shown in FIGS. 6a and 6b, indicating the formation of a mezzanine balcony interior to a building, and indicated globally at 600. Again, identical or similar features to those described in the context of the previously-described embodiments of the invention will be referred to using identical or similar reference numerals, and further detailed description will be omitted for brevity.

In this particular embodiment, there is provided an upper level 656 which is positioned above a dancefloor 658. There is a safety rail, banister or balustrade 606 provided which prevents persons present on the upper level 656 from falling.

The present railing apparatus 600 may be provided so as to be able to extend the floor space available in the upper level. For instance, a portion of the safety railing 608 may be pivoted, for instance, by using winches or hydraulic actuators, such that a safety platform 610 extends horizontally away from the floor of the upper level 656.

The safety railing 608 may then be extended vertically, for instance, by being raised using one of the mechanisms detailed in respect of the preceding embodiments, and the sides of the safety railing 608 extended so as to provide a complete safety rail 606 around the entire perimeter of the upper level 656. In doing so, a floor span of the upper level 656 is extended without compromising the protection conferred by the safety rail 606. This may provide additional area for personnel or equipment, as illustrated in FIG. 6b.

This railing apparatus 600 illustrates how the present invention could be utilised in interior areas of a building, and that the invention is not limited to providing additional external space. It will also be apparent that the present invention could be utilised in the interior areas of buildings, ships, airplanes, large road vehicles, trains and similar, and that the invention is not solely limited to the provision of additional external space.

It is therefore possible to provide a mechanism by which a balustrade attached to the exterior of a building at or adjacent to a window can be converted into a balcony or balconette to allow a person inside the building to experience an external space. Alternatively, the interior floor space of upper levels of a building could also be increased using the present invention. This can be achieved by moving the balustrade railing horizontally away from its initial position, and positioning a balcony platform in the space created between the two.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A balustrade system for providing a balcony for a window, the balustrade apparatus system comprising:
   a balustrade apparatus comprising:
      a balustrade railing;
      a support fixing for retaining the balustrade railing in a retracted condition;
      a balcony platform which is pivotably engagable with the balustrade railing; and
      an actuation means for actuating the balustrade railing between the retracted condition and an extended condition which is different to the retracted condition;
      wherein, in the extended condition, the balcony platform extends horizontally, with the balustrade railing being spaced apart from its position in the retracted condition to form a balcony rail for the balcony platform; and
      wherein the balustrade railing includes first and second railing portions, the first and second railing portions being movable relative to one another such that the balustrade railing is vertically extendible in at least the extended condition; and
   an openable window associated with the balustrade apparatus, wherein one or more openable panels of the window are positionable to provide a barrier at or adjacent to a lateral edge of the balcony platform in the extended condition.

2. The balustrade system as claimed in claim 1, wherein in the retracted condition, the balustrade railing and balcony platform are co-planar with one another.

3. The balustrade system as claimed in claim 1, wherein the first and second railing portions are pivotable relative to one another.

4. The balustrade system as claimed in claim 1, wherein the first and second railing portions are telescopically extendible and/or retractable relative to one another.

5. The balustrade system as claimed in claim 1, wherein the balcony platform is opaque or substantially opaque.

6. The balustrade system as claimed in claim 1, wherein the actuation means includes one or more hydraulic actuators.

7. The balustrade system as claimed in claim 1, wherein the actuations means includes one or more winches.

8. The balustrade system as claimed in claim 1, wherein the support fixing is an external wall support fixing.

9. The balustrade system as claimed in claim 1, wherein the window is a stable-door window having upper and lower openable panels.

10. The balustrade system as claimed in claim 1, further comprising an awning positioned above the window which is openable to provide a cover to the balcony platform in the extended condition.

11. A method of operating an extendible and retractable balcony for a building, the method comprising the steps of:
 a] providing a balustrade apparatus as claimed in claim 1 in a retracted condition; and
 b] activating the actuation means of the apparatus to transition the apparatus into an extended condition, in which the balcony platform extends horizontally from a wall of the building, with the balustrade railing being spaced apart from the wall to form a balcony rail for the balcony platform.

12. The method as claimed in claim 11, wherein the balcony platform extends horizontally from an exterior wall of the building.

13. The method as claimed in claim 11, wherein the balcony platform extends horizontally from an interior wall of the building to form a mezzanine balcony.

* * * * *